(12) United States Patent
Murakami

(10) Patent No.: US 8,863,918 B2
(45) Date of Patent: Oct. 21, 2014

(54) HYDRAULIC SHOCK ABSORBER

(75) Inventor: Yosuke Murakami, Shizuoka (JP)

(73) Assignee: Showa Corporation (JP)

( * ) Notice: Subject to any disclaimer, the term of this patent is extended or adjusted under 35 U.S.C. 154(b) by 85 days.

(21) Appl. No.: 13/528,787

(22) Filed: Jun. 20, 2012

(65) Prior Publication Data

US 2013/0105259 A1 May 2, 2013

(30) Foreign Application Priority Data

Oct. 31, 2011 (JP) ................................. 2011-238555

(51) Int. Cl.
*F16F 9/06* (2006.01)
*F16F 9/088* (2006.01)

(52) U.S. Cl.
CPC ................. *F16F 9/064* (2013.01); *F16F 9/088* (2013.01); *F16F 9/066* (2013.01)
USPC ........ 188/269; 188/313; 188/317; 188/319.1; 188/298; 267/64.26

(58) Field of Classification Search
USPC ......... 188/269, 313–317, 319.1, 322.22, 298; 267/64.26, 64.27, 64.23, 64.13, 118; 280/124.158
See application file for complete search history.

(56) References Cited

U.S. PATENT DOCUMENTS

| | | | | |
|---|---|---|---|---|
| 2,225,986 A | * | 12/1940 | Glezen | 188/314 |
| 2,357,278 A | * | 8/1944 | O'Connor | 188/269 |
| 3,625,321 A | * | 12/1971 | Lutz | 188/298 |
| 3,944,197 A | * | 3/1976 | Dachicourt | 267/64.23 |
| 4,106,596 A | * | 8/1978 | Hausmann | 188/314 |
| 5,398,786 A | * | 3/1995 | Mintgen | 188/284 |
| 5,848,675 A | * | 12/1998 | Gonzalez | 188/319.2 |
| 5,971,117 A | * | 10/1999 | Grundei et al. | 188/288 |
| 6,042,091 A | * | 3/2000 | Marzocchi et al. | 267/64.15 |
| 6,352,145 B1 | * | 3/2002 | DeMolina et al. | 188/281 |
| 6,659,242 B2 | * | 12/2003 | Nagai | 188/315 |
| 6,776,269 B1 | * | 8/2004 | Schel | 188/287 |
| 7,743,895 B2 | * | 6/2010 | Krawczyk | 188/282.8 |
| 7,913,823 B2 | * | 3/2011 | Murakami | 188/314 |
| 8,235,187 B2 | * | 8/2012 | Murakami | 188/285 |
| 8,245,823 B2 | * | 8/2012 | Zeissner et al. | 188/322.22 |
| 8,261,895 B2 | * | 9/2012 | Murakami | 188/313 |

FOREIGN PATENT DOCUMENTS

JP       2003-269515       9/2003

* cited by examiner

*Primary Examiner* — Thomas J Williams
*Assistant Examiner* — Mariano Sy
(74) *Attorney, Agent, or Firm* — Keith H. Orum; Orum & Roth, LLC

(57) ABSTRACT

In a hydraulic shock absorber, upper and lower pistons forming upper and lower two stages are fixed to a leading end portion of a piston rod. An intermediate oil chamber is provided between the upper and lower pistons. An intermediate air chamber is provided in such a manner as to compensate an oil amount change in an oil chamber by coming into contact with the intermediate oil chamber and expanding and compressing on the basis of the oil amount change of the oil chamber caused by an extension and compression stroke of the piston rod, and an air compression rate of an upper portion air chamber of the oil reservoir chamber is set to be equal to or more than an air compression rate of the intermediate air chamber, with respect to the extension and compression stroke of the piston rod.

18 Claims, 15 Drawing Sheets

PRIOR ART

HYDRAULIC SHOCK ABSORBER

BACKGROUND OF THE INVENTION

1. Field of the Invention

The present invention relates to a hydraulic shock absorber.

2. Description of the Related Art

In a hydraulic shock absorber in which a damper cylinder is not provided in inner portions of an outer tube and an inner tube, there is a structure in which the inner tube is slidably inserted into the outer tube. A partition wall member is provided in an inner periphery of the inner tube. An oil chamber is defined at a lower side of the partition wall member. An oil reservoir chamber is defined in an upper portion of the partition wall member. A piston rod attached to the outer tube is slidably inserted into the inner tube through the partition wall member, and a piston coming into slidable contact with an inner periphery of the inner tube is fixed to a leading end portion of the piston rod inserted into the inner tube.

In the conventional hydraulic shock absorber, in Japanese Patent Application Laid-Open (JP-A) No. 2003-269515, as shown in FIG. 15, there is disclosed a structure in which an inner tube 2 is slidably inserted into an outer tube 1 via seal means 1A and 2A which are respectively fixed to an opening portion in an inner periphery of the outer tube 1 and a leading end portion of an outer periphery of the inner tube 2. An annular oil chamber 3 is surrounded by the inner periphery of the outer tube 1, the outer periphery of the inner tube 2 and these two seal means 1A and 2A is defined. A partition wall member 4 is provided in an inner periphery of the inner tube 2. An oil chamber 5 is defined at a lower side, and an oil reservoir chamber 6 is defined at an upper side. Further, in this hydraulic shock absorber, a piston 7A coming into slidable contact with an inner periphery of the inner tube 2 is fixed to a leading end portion of the piston rod 7 which is inserted into the inner tube 2. The oil chamber 5 is divided into a piston rod side oil chamber 5A in which the piston rod 7 is accommodated and a piston side oil chamber 5B in which the piston rod 7 is not accommodated. The annular oil chamber 3 is communicated with the piston rod side oil chamber 5A or the piston side oil chamber 5B via an oil hole 3A which is provided in the inner tube 2. A compression side damping force generating valve 8A and an extension side damping force generating valve 8B are provided respectively in a compression side flow path and an extension side flow path which are provided in the piston 7A and communicates the piston rod side oil chamber 5A with the piston side oil chamber 5B. Further, in this hydraulic shock absorber, a cross sectional area S1 of the annular oil chamber 3 is formed larger than a cross sectional area S2 of the piston rod 7. The partition wall member 4 is provided with a check valve 9A which blocks a flow from the oil chamber 5 to the oil reservoir chamber 6 at a time of an extension side stroke, and the partition wall member 4 is provided with a micro flow path 9B which passes through the oil chamber 5 and the oil reservoir chamber 6.

In the hydraulic shock absorber described in JP-A No. 2003-269515, a working fluid at an amount of an inserting volumetric capacity of the piston rod 7 going into the inner tube 2 in a compression side stroke is transferred to the annular oil chamber 3 from the oil chamber 5A in an inner periphery of the inner tube 2 via the oil hole 3A of the inner tube 2. At this time, since a volume increasing amount ΔS1 (a replenishing amount) of the annular oil chamber 3 is larger than a volume increasing amount ΔS2 of the piston rod 7, a shortfall of (ΔS1−ΔS2) a necessary replenishing amount of the oil to the annular oil chamber 3 is replenished from the oil reservoir chamber 6 via a check valve 9A. In this compression side stroke, a compression side damping force is generated on the basis of a deflecting deformation of the compression side damping force generating valve 8A.

Further, the working fluid in an amount of a going-out volumetric capacity of the piston rod 7 going out of the inner tube 2 in an extension side stroke is transferred to the oil chamber 5A in the inner periphery of the inner tube 2 from the annular oil chamber 3 via the oil hole 3A of the inner tube 2. At this time, since the volume reducing amount ΔS1 (a discharge amount) of the annular oil chamber 3 is larger than the volume reducing amount ΔS2 of the piston rod 7, a surplus amount of (ΔS1−ΔS2) in the discharge amount of the oil from the annular oil chamber 3 is discharged to the oil reservoir chamber 6 via the micro flow path 9B. In this extension side stroke, an extension side damping force is generated on the basis of a deflecting deformation of the extension side damping force generating valve 8B. Further, an extension side damping force is generated by a passage resistance of the micro flow path 9B.

In the hydraulic shock absorber described in JP-A No. 2003-269515, the working fluid in the piston side oil chamber 5B which is compressed by the piston 7A in the compression side stroke deflects and deforms the compression side damping force generating valve 8A, thereby generating a stable compression side damping force.

However, in the extension side stroke, the extension side damping force generated in the micro flow path 9B of the partition wall member 4 is caused by the setting of the passage resistance of the micro flow path 9B and a small amount of surplus oil amount of (ΔS1−ΔS2) mentioned above and passing through the micro flow path 9B, and is unstable. Therefore, in the hydraulic shock absorber described in JP-A No. 2003-269515, there is a problem in generation of a stable extension side damping force.

Further, in the hydraulic shock absorber described in JP-A No. 2003-269515, the pressure of the working fluid in the piston rod side oil chamber 5A which is compressed by the piston 7A in the extension side stroke is directly applied to the seal means 1A and 2A of the outer tube 1 and the inner tube 2. Accordingly, a maximum value of the extension side damping force is restricted on the basis of a relationship of tendency that friction is deteriorated by an application of a great tension force due to a self-seal effect of the seal means 1A to the inner tube 2, and a pressure application to the seal means 1A.

Further, in the hydraulic shock absorber described in JP-A No. 2003-269515, in the compression side stroke, an air chamber in the oil reservoir chamber 6 in the upper portions of the outer tube 1 and the inner tube 2 is compressed so as to serve as an air spring, however, since the pressure is applied as it is to the compression side damping force generating valve 8A, a hardness feeling is generated at the far side of the compression side stroke.

SUMMARY OF THE INVENTION

An object of the present invention is to achieve a stabilization of a damping force generating mechanism, in a hydraulic shock absorber in which a piston is brought into slidable contact with an inner periphery of an inner tube.

In accordance with an embodiment of the present invention, there is provided a hydraulic shock absorber comprising an outer tube. An inner tube is slidably inserted into the outer tube. A partition member is provided in an inner periphery of the inner tube. An oil chamber is defined at a lower side of the partition wall member. An oil reservoir chamber is defined at an upper side of the partition wall member. A piston rod is attached to the outer tube, the piston rod being slidably inserted into the inner tube through the partition wall member. A piston comes into slidable contact with the inner periphery of the inner tube, the piston being fixed to a leading end portion of the piston rod inserted into the inner tube. The piston comprises upper and lower pistons, the upper and lower pistons form upper and lower two stages, and are fixed to the leading end portion of the piston rod. An upper side of the upper piston is provided with an upper oil chamber in which the piston rod is accommodated. A lower side of the lower piston is provided with a lower oil chamber in which the piston rod is not accommodated. An intermediate oil chamber is provided between the upper and lower pistons. An extension side damping force generating means is provided in a flow path which is provided in the upper piston and heads for the intermediate oil chamber from the upper oil chamber. A compression side damping force generating means is provided in a flow path which is provided in the lower piston and heads for the intermediate oil chamber from the lower oil chamber. The partition wall member is provided with a volume compensating flow path which communicates the oil reservoir chamber with the oil chamber. An intermediate air chamber is provided in such a manner as to compensate an oil amount change in the oil chamber by coming into contact with the intermediate oil chamber and expanding and compressing on the basis of the oil amount change of the oil chamber caused by an extension and compression stroke of the piston rod. An air compression rate of the upper portion air chamber of the oil reservoir chamber is set to be equal to or more than an air compression rate of the intermediate air chamber, with respect to the extension and compression stroke of the piston rod.

In accordance with one embodiment of the present invention, the intermediate air chamber is defined by a flexible partition wall means which is arranged in the intermediate oil chamber.

In accordance with another embodiment of the present invention, the intermediate air chamber is defined by a flexible partition wall means which is arranged in an outer portion communicating with the intermediate oil chamber.

In accordance with another embodiment of the present invention, the intermediate air chamber is left open to an ambient air.

In accordance with another embodiment of the present invention, the intermediate air chamber is communicated with the upper portion air chamber of the oil reservoir chamber.

In accordance with another embodiment of the present invention, the upper oil chamber is communicated with an annular oil chamber between the inner periphery of the outer tube and the outer periphery of the inner tube.

In accordance with another embodiment of the present invention, the flexible partition wall means is constructed by a bladder which is provided around the piston rod.

In accordance with another embodiment of the present invention, the flexible partition wall means is constructed by a free piston, an inner periphery of the free piston is slidably fitted in a liquid tight manner to an outer periphery of the piston rod, and an outer periphery of the free piston is slidably fitted in a liquid tight manner to an inner periphery of a closed-top tubular portion which is provided in the outer periphery of the piston rod and is open in its one end, respectively.

In accordance with another embodiment of the present invention, the flexible partition wall means is structured such that a sealed space is formed in an upper portion of the piston rod. The upper portion of the piston rod is provided with a bladder which divides an inner portion of the sealed space into upper and lower sections, and the lower space below the bladder in the inner portion of the sealed space is formed as an external portion oil chamber which is communicated with the intermediate oil chamber by a communication path pierced in the piston rod.

In accordance with the present embodiment, the following operations and effects can be achieved.

(a) The upper and lower pistons forming the upper and lower two stages are fixed to the leading end portion of the piston rod. The upper side of the upper piston is provided with the upper oil chamber in which the piston rod is accommodated. The lower side of the lower piston is provided with the lower oil chamber in which the piston rod is not accommodated. The intermediate oil chamber is provided between the upper and lower pistons. The extension side damping force generating means is provided in the flow path which is forwarding to the intermediate oil chamber from the upper oil chamber provided in the upper piston. The compression side damping force generating means is provided in the flow path which is forwarding to the intermediate oil chamber from the lower oil chamber provided in the lower piston. The partition wall member is provided with the volume compensating flow path which communicates the oil reservoir chamber with the oil chamber. The intermediate air chamber is provided in such a manner as to compensate the oil amount change in the oil chamber by coming into contact with the intermediate oil chamber and expanding and compressing on the basis of the oil amount change of the oil chamber caused by the extension and compression stroke of the piston rod. The air compression rate of the upper portion air chamber of the oil reservoir chamber is set to be equal to or more than the air compression rate of the intermediate air chamber, with respect to the extension and compression stroke of the piston rod.

(b) Accordingly, in the compression side stroke, the upper portion air chamber of the oil reservoir chamber is more compressed than the intermediate air chamber, and the upper portion air chamber comes to be higher pressure. As a result, the oil in the oil reservoir chamber flows into the upper oil chamber, and the intermediate air chamber compresses at the volume obtained by adding the oil inflow amount to the upper oil chamber mentioned above to the inserting volumetric capacity of the piston rod into the inner tube.

When the oil in the lower oil chamber which is pressurized in the compression side stroke deflects and deforms the compression side damping force generating means of the lower piston so as to generate the compression side damping force, the intermediate air chamber is in the downstream side of the compression side damping force generating means, and does not make the compression side damping force unstable.

The upper oil chamber which is pressurized at a time of being reversed to the extension side stroke from the compression side stroke is set to the positive pressure on the basis of the inflow of the oil from the oil reservoir chamber mentioned above, and a pause of the damping force at a time of reversing to the extension side (a delay of the generation of the damping force) is not generated.

(c) In the extension side stroke, the upper portion air chamber of the oil reservoir chamber is inflated more than the intermediate air chamber, and the upper portion air chamber comes to be lower pressure. As a result, the oil in the upper oil chamber flows out to the oil reservoir chamber, and the intermediate air chamber is inflated only at the volume obtained by adding the oil outflow amount from the upper oil chamber mentioned above to the going-out volumetric capacity of the piston rod from the inner tube.

When the oil in the upper oil chamber which is pressurized in the extension side stroke deflects and deforms the extension side damping force generating means of the upper piston so as to generate the extension side damping force, the intermediate air chamber is in the downstream side of the extension side damping force generating means, and does not make the extension side damping force unstable.

The lower oil chamber which is pressurized at a time of being reversed to the compression side stroke from the extension side stroke is not set to the negative pressure. The outflow oil amount to the oil reservoir chamber from the upper oil chamber in the extension side stroke is the surplus oil amount which flows into the upper oil chamber from the oil reservoir chamber in the compression side stroke, and does not generate the shortage in the oil amount in the upper and lower oil chambers. A pause of the damping force at a time of reversing to the compression side is thereby not generated.

(d) The flexible partition wall means arranged in the intermediate oil chamber comes into contact with the intermediate oil chamber, and expands and compresses on the basis of the oil amount change of the oil chamber caused by the extension and compression stroke of the piston rod. It is thereby possible to define the intermediate air chamber which compensates the oil amount change of the oil chamber.

(e) The flexible partition wall means arranged in the outer portion communicating with the intermediate oil chamber comes into contact with the intermediate oil chamber, and expands and compresses on the basis of the oil amount change of the oil chamber caused by the extension and compression stroke of the piston rod. It is thereby possible to define the intermediate air chamber which compensates the oil amount change of the oil chamber. In accordance with this, it is possible to form the intermediate air chamber having the great volumetric capacity, and it is possible to easily set the air compression rate of the upper portion air chamber of the oil reservoir chamber to be equal to more than the air compression rate of the intermediate air chamber.

(f) It is possible to easily set the air compression rate of the upper portion air chamber of the oil reservoir chamber to be equal to or more than the air compression rate of the intermediate air chamber, by leaving the intermediate air chamber open to the ambient air.

(g) It is possible to set the air compression rate of the upper portion air chamber of the oil reservoir chamber to be equal to the air compression rate of the intermediate air chamber, by communicating the intermediate air chamber with the upper portion air chamber of the oil reservoir chamber.

(h) The upper oil chamber is structured such as to be communicated with the annular oil chamber between the inner periphery of the outer tube and the outer periphery of the inner tube. The compressing amount or the inflating amount of the intermediate air chamber is thereby reduced only at the volume change amount of the annular oil chamber. In accordance with this, it is possible to reduce the air compression rate of the intermediate air chamber, and it is possible to downsize the volume of the flexible partition wall means.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings.

DESCRIPTION OF THE PREFERRED EMBODIMENTS

Figure 1:
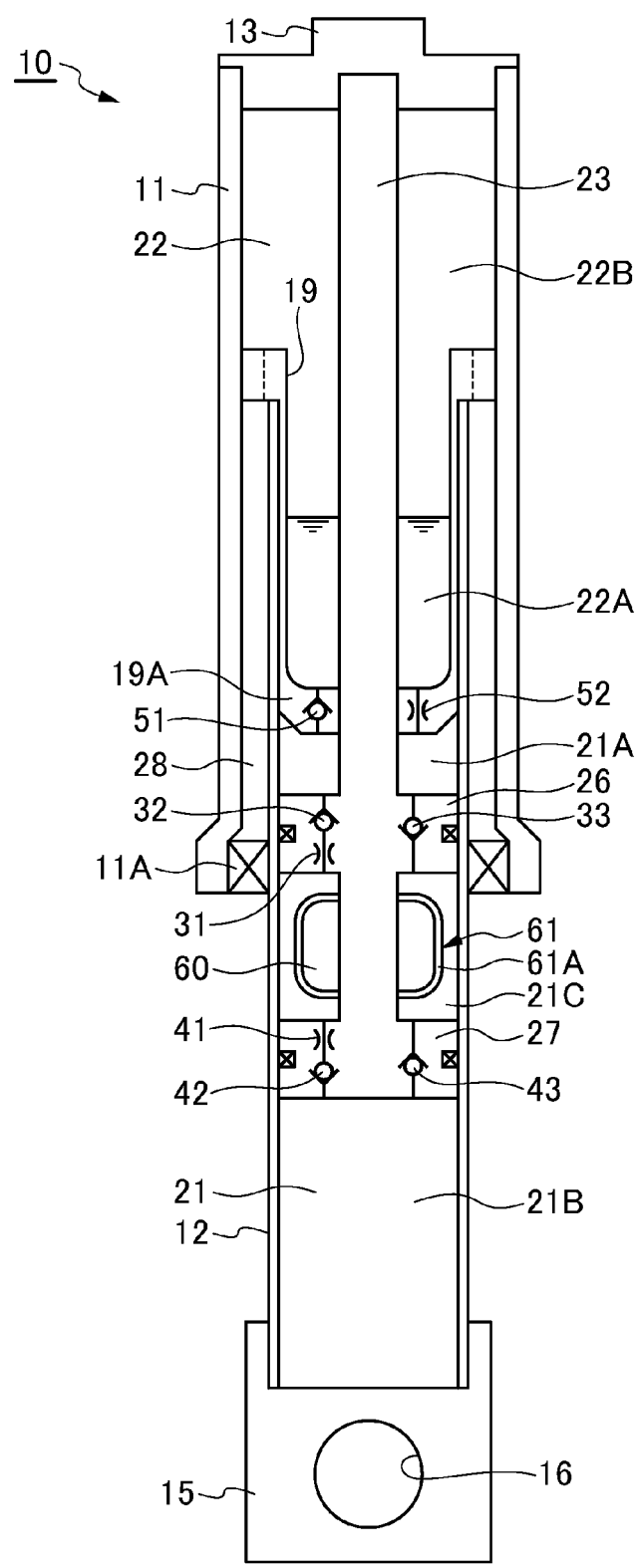
FIG. 1 is a schematic cross sectional view showing a hydraulic shock absorber in accordance with Embodiment 1.
Figure 2:
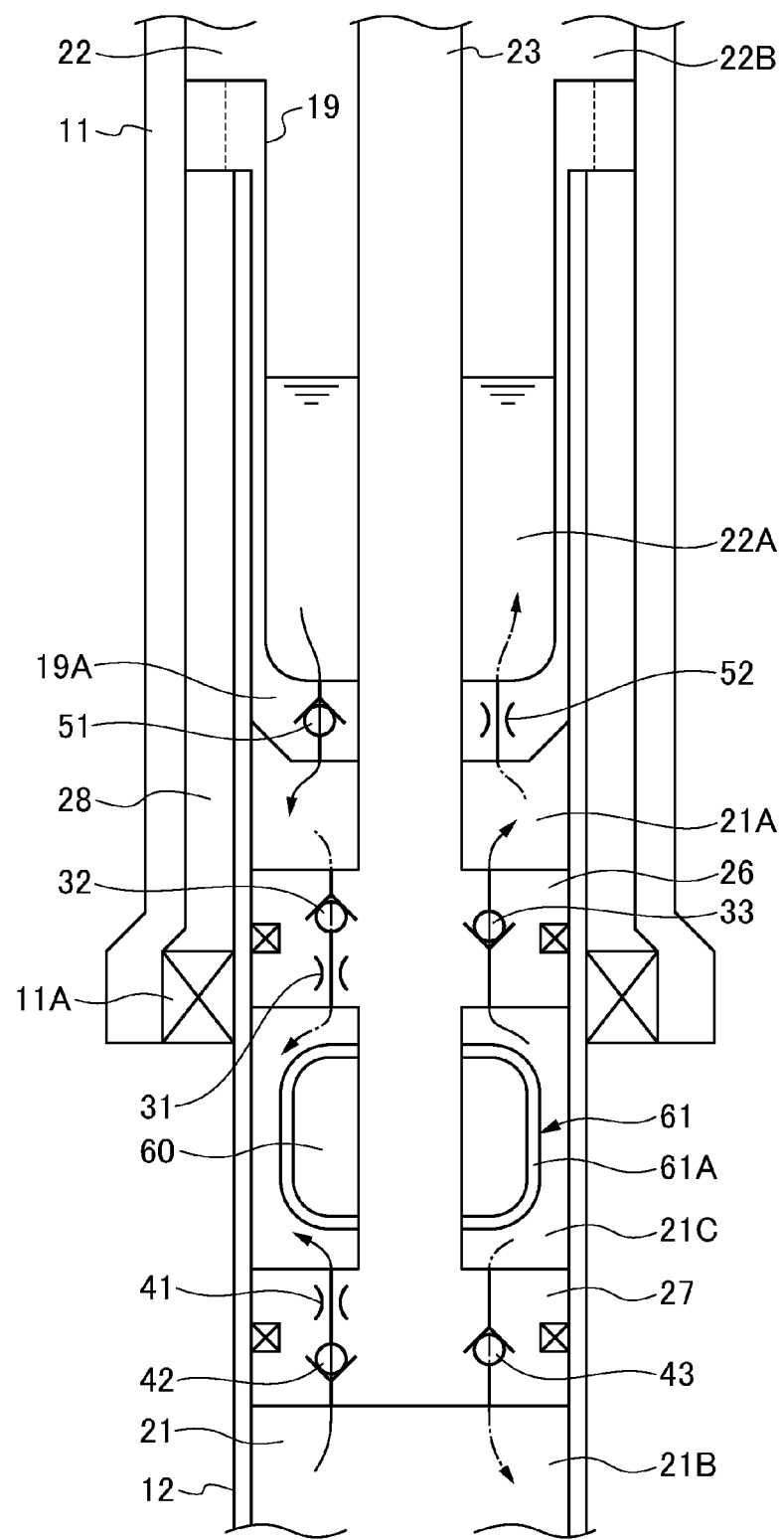
FIG. 2 is an enlarged cross sectional view of a substantial part in FIG. 1.

One embodiment is shown in FIG. 1 and FIG. 2. A hydraulic shock absorber 10 is structured, as shown in FIG. 1, such that an inner tube 12 is slidably inserted into an inner portion of an outer tube 11 via a seal means 11A which is fixed to an inner periphery of a lower end opening portion of the outer tube 11. A cap 13 is threadably attached to an upper end opening portion of the outer tube 11, and a vehicle body side attaching member (not shown) is provided in an outer periphery of the outer tube 11. A bottom bracket 15 is threadably attached in a liquid tight manner to a lower end opening portion of the inner tube 12, and a wheel side attaching member 16 is provided in the bottom bracket 15.

The hydraulic shock absorber 10 is structured such that a partition wall member 19 is provided in a liquid tight manner in an upper end side inner periphery of the inner tube 12. An oil chamber 21 is defined in a lower portion than a rod guide portion 19A of the partition wall member 19, and an oil reservoir chamber 22 is defined at an upper side. A lower region in the oil reservoir chamber 22 is an oil chamber 22A, and an upper region is an upper portion air chamber 22B.

The hydraulic shock absorber 10 is structured such that a piston rod 23 attached to the outer tube 11 is slidably inserted into the rod guide portion 19A of the partition wall member 19.

The hydraulic shock absorber 10 is structured such that pistons 26 and 27 coming into slidable contact with an inner periphery of the inner tube 12 are fixed to a leading end portion of the piston rod 23 which is inserted into the inner tube 12 from the rod guide portion 19A of the partition wall member 19. In other words, the upper and lower pistons 26 and 27 forming upper and lower two stages are fixed to the leading end portion of the piston rod 23, and the oil chamber 21 is divided into an upper oil chamber 21A, a lower oil chamber 21B and an intermediate oil chamber 21C. The upper oil chamber 21A is provided in an upper side of the upper piston 26, and accommodates the piston rod 23. The lower oil chamber 21B is provided in a lower side of the lower piston 27, and does not accommodate the piston rod 23. The intermediate oil chamber 21C is provided between the upper and lower pistons 26 and 27.

In this case, in the hydraulic shock absorber 10, an annular oil chamber 28 between the inner periphery of the outer tube 11 and the outer periphery of the inner tube 12 is directly communicated with the oil reservoir chamber 22.

The hydraulic shock absorber 10 is provided with an extension side damping force generating means 31 such as an extension side disc valve, and a check valve 32 which allows only a flow in one direction from the upper oil chamber 21A to the intermediate oil chamber 21C, in a flow path which is provided in the upper piston 26 and heads for the intermediate oil chamber 21C from the upper oil chamber 21A, as shown in FIG. 2. Further, a check valve 33 which allows only a flow in one direction from the intermediate oil chamber 21C to the upper oil chamber 21A is provided in a flow path which is provided in the upper piston 26 and heads for the upper oil chamber 21A from the intermediate oil chamber 21C.

The hydraulic shock absorber 10 is provided with a compression side damping force generating means 41 such as a compression side disc valve, and a check valve 42 which allows only a flow in one direction from the lower oil chamber 21B to the intermediate oil chamber 21C, in a flow path which is provided in the lower piston 27 and heads for the intermediate oil chamber 21C from the lower oil chamber 21B. Further, a check valve 43 which allows only a flow in one direction from the intermediate oil chamber 21C to the lower oil chamber 21B is provided in a flow path which is provided in the lower piston 27 and heads for the lower oil chamber 21B from the intermediate oil chamber 21C.

The hydraulic shock absorber 10 is provided in the partition wall member 19, with a check valve 51 and an orifice 52 in parallel, as a volume compensating flow path which communicates the oil chamber 21 (the upper oil chamber 21A) with the oil reservoir chamber 22 (the oil chamber 22A). The check valve 51 allows only a flow in one direction from the oil chamber 22A to the upper oil chamber 21A.

The hydraulic shock absorber 10 is provided with an intermediate air chamber 60 which compensates an oil amount change of the oil chamber 21 by coming into contact with the intermediate oil chamber 21C and expanding and compressing on the basis of an oil amount change of the oil chamber 21 caused by an extending and compressing stroke of the piston rod 23. In the present embodiment, the intermediate air chamber 60 is defined with respect to the intermediate oil chamber 21C by a flexible partition wall means 61 which is arranged in the intermediate oil chamber 21C and is provided around the piston rod 23. The flexible partition wall means 61 is constructed by a bladder 61A.

The hydraulic shock absorber 10 is structured such that an air compression rate A1 of the upper portion air chamber 22B of the oil reservoir chamber 22 is set to be equal to or more than an air compression rate A2 of the intermediate air chamber 60 which the flexible partition wall means 61 defines, with respect to the extending and compressing stroke of the piston rod 23 (A1≥A2).

In the hydraulic shock absorber 10, a suspension spring is provided in an inner portion or an outer portion of the outer tube 11 and the inner tube 12. The hydraulic shock absorber 10 absorbs a shock force which is received from a road surface at a time of a vehicle travel on the basis of an extending and compressing vibration of the suspension spring. Further, the hydraulic shock absorber 10 controls an extending and compressing vibration of the suspension spring, on the basis of damping forces which are generated by the extension side damping force generating means 31 and the compression side damping force generating means 41 mentioned above.

In the compression side stroke, as shown by solid lines in FIG. 2, the oil in the pressurized lower oil chamber 21B flows to the intermediate oil chamber 21C through the compression side damping force generating means 41 from the check valve 42 of the lower piston 27, and generates the compression side damping force caused by the flow path resistance of the compression side damping force generating means 41 at this time. Further, with respect to the expanded upper oil chamber 21A, the oil in the intermediate oil chamber 21C flows to the upper oil chamber 21A through the check valve 33 of the upper piston 26, and the oil in the oil chamber 22A of the oil reservoir chamber 22 flows to the upper oil chamber 21A through the check valve 51 at the same time.

In this compression side stroke, the upper portion air chamber 22B of the oil reservoir chamber 22 is more compressed than the intermediate air chamber 60, and the upper portion air chamber 22B comes to be a higher pressure. As a result, the oil in the oil chamber 22A of the oil reservoir chamber 22 flows into the upper oil chamber 21A through the check valve 51 of the partition wall member 19, and the intermediate air chamber 60 is compressed only at a volume obtained by adding an oil inflow amount to the upper oil chamber 21A mentioned above to an inserting volumetric capacity of the piston rod 23 to the inner tube 12.

When the oil in the lower oil chamber 21B which is pressurized in the compression side stroke deflects and deforms the compression side damping force generating means 41 of the lower piston 27 so as to generate the compression side damping force, the intermediate air chamber 60 is in a downstream side of the compression side damping force generating means 41 and does not make the compression side damping force unstable.

The upper oil chamber 21A which is pressurized at a time of being reversed to the extension side stroke from the compression side stroke is set to a positive pressure on the basis of an inflow of the oil from the oil reservoir chamber 22 mentioned above. A pause of the damping force at a time of being reversed to the extension side (a delay of generation of the damping force) is thereby not generated.

In the extension side stroke, as shown by chain lines in FIG. 2, the oil in the pressurized upper oil chamber 21A flows into the intermediate oil chamber 21C through the extension side damping force generating means 31 from the check valve 32 of the upper piston 26, and generates an extension side damping force caused by a flow path resistance of the extension side damping force generating means 31 at this time. Further, with respect to the expanded lower oil chamber 21B, the oil in the intermediate oil chamber 21C flows to the lower oil chamber 21B through the check valve 43 of the lower piston 27.

In the extension side stroke, the upper portion air chamber 22B of the oil reservoir chamber 22 is inflated more than the intermediate air chamber 60, and the upper portion air chamber 22B comes to be a lower pressure. As a result, the oil in the upper oil chamber 21A flows out to the oil chamber 22A of the oil reservoir chamber 22 through the orifice 52 of the partition wall member 19, and the intermediate air chamber 60 is inflated only at the volume obtained by adding the oil outflow amount from the upper oil chamber 21A mentioned above to the going-out volumetric capacity of the piston rod 23 from the inner tube 12.

When the oil in the upper oil chamber 21A which is pressurized in the extension side stroke deflects and deforms the extension side damping force generating means 31 of the upper piston 26 so as to generate the extension side damping force, the intermediate air chamber 60 is in a downstream side of the extension side damping force generating means 31, and does not make the extension side damping force unstable.

The lower oil chamber 21B which is pressurized at a time of being reversed to the compression side stroke from the extension side stroke is not set to the negative pressure. The outflow oil amount to the oil reservoir chamber 22 from the upper oil chamber 21A in the extension side stroke is a surplus oil amount which flows into the upper oil chamber 21A from the oil reservoir chamber 22 in the compression side stroke, and does not generate a shortage in the oil amount in the upper and lower oil chambers 21A and 21B. A pause of the damping force at a time of reversing to the compression side is thereby not generated.

Accordingly, in accordance with the present embodiment, a stable damping force can be generated as mentioned above, in both of the compression side stroke and the extension side stroke.

Further, the pressure in the oil chamber 21 is not applied to the seal means 11A of the outer tube 11. The maximum values of the compression side damping force and the extension side damping force are not restricted on the basis of a relationship of a tension force which the seal means 11A applies to the inner tube 12, and a pressure application to the seal means 11A.

Further, when the upper portion air chamber 22B of the oil reservoir chamber 22 is compressed so as to serve as an air spring, in the compression side stroke, the pressure is not applied as it is to the compression side damping force generating means 41 of the lower piston 27, and a hardness feeling is not generated at the far side of the compression side stroke.

Further, since the flexible partition wall means 61 arranged in the intermediate oil chamber 21C comes into contact with the intermediate oil chamber 21C, and expands and compresses on the basis of the oil amount change of the oil chamber 21 caused by the extending and compressing stroke of the piston rod 23, it is possible to define the intermediate air chamber 60 which compensates the oil amount change of the oil chamber 21.

Figure 3:
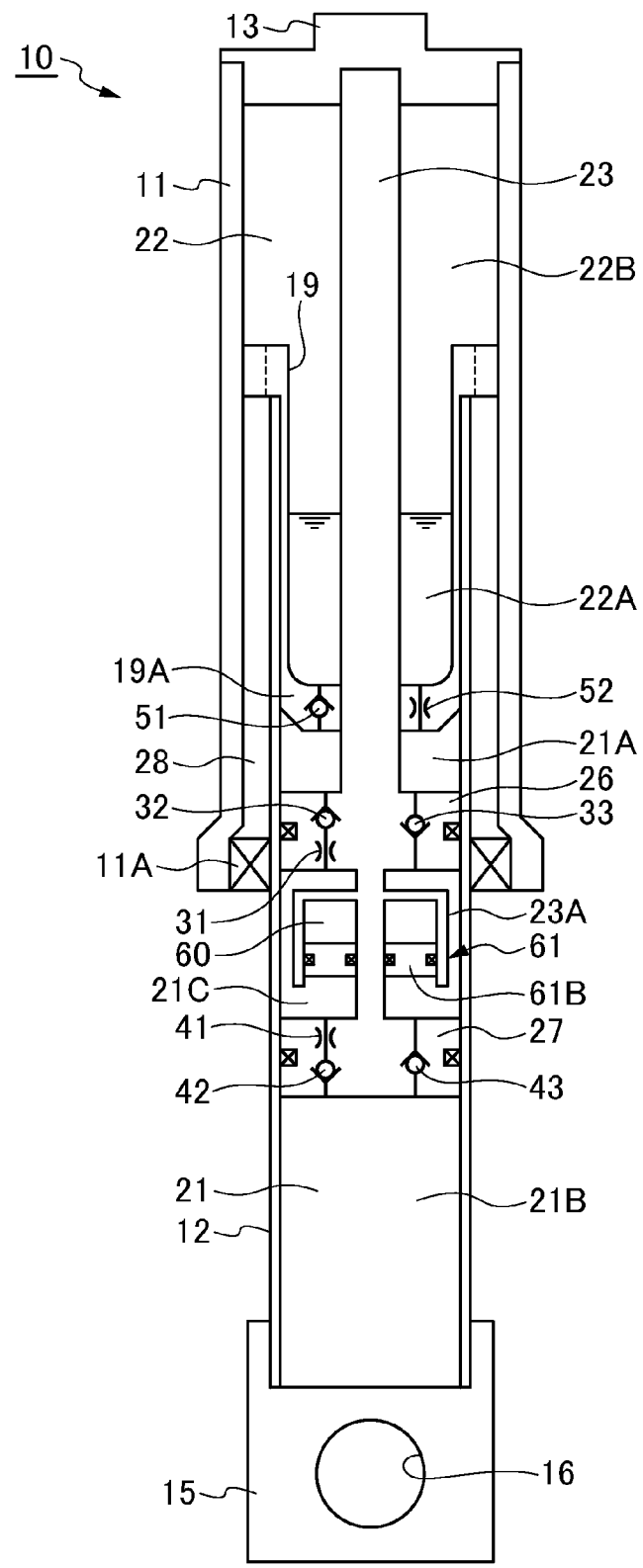
FIG. 3 is a schematic cross sectional view showing a hydraulic shock absorber in accordance with Embodiment 2.
Figure 4:
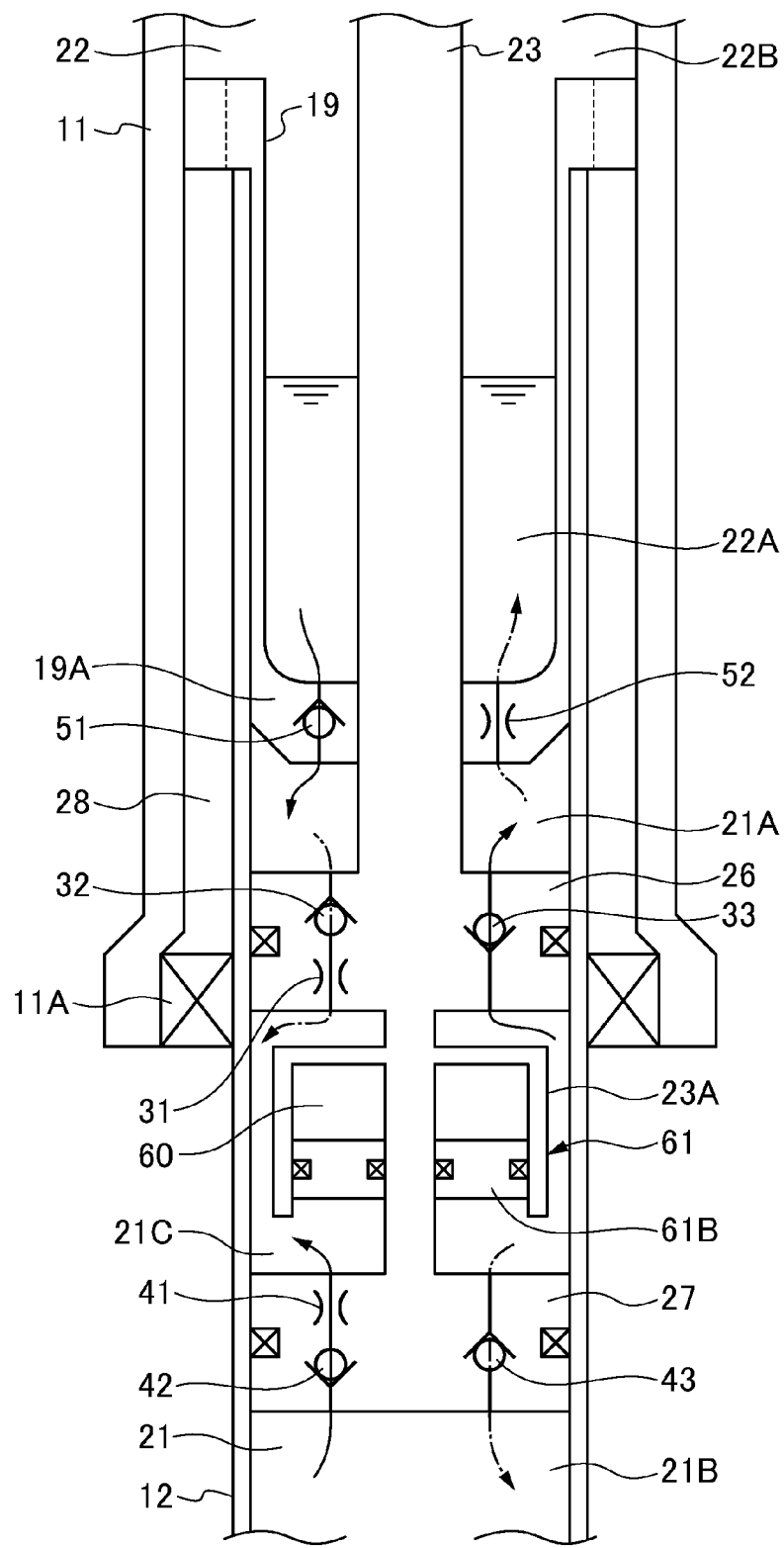
FIG. 4 is an enlarged cross sectional view of a substantial part in FIG. 3.

As shown in FIG. 3 and FIG. 4, an additional embodiment exists in a point that the flexible partition wall means 61 is constructed by a free piston 61B.

The flexible partition wall means 61 is structured such that an inner periphery of the free piston 61B is slidably fitted in a liquid tight manner to an outer periphery of the piston rod 23. An outer periphery of the free piston 61B is slidably fitted in a liquid tight manner to an inner periphery of a closed-top tubular portion 23A which is provided in the outer periphery of the piston rod 23 and is open in its one end, respectively. In accordance with this, the free piston 61B defines an upper space of the tubular portion 23A as the intermediate air chamber 60.

Figure 5:
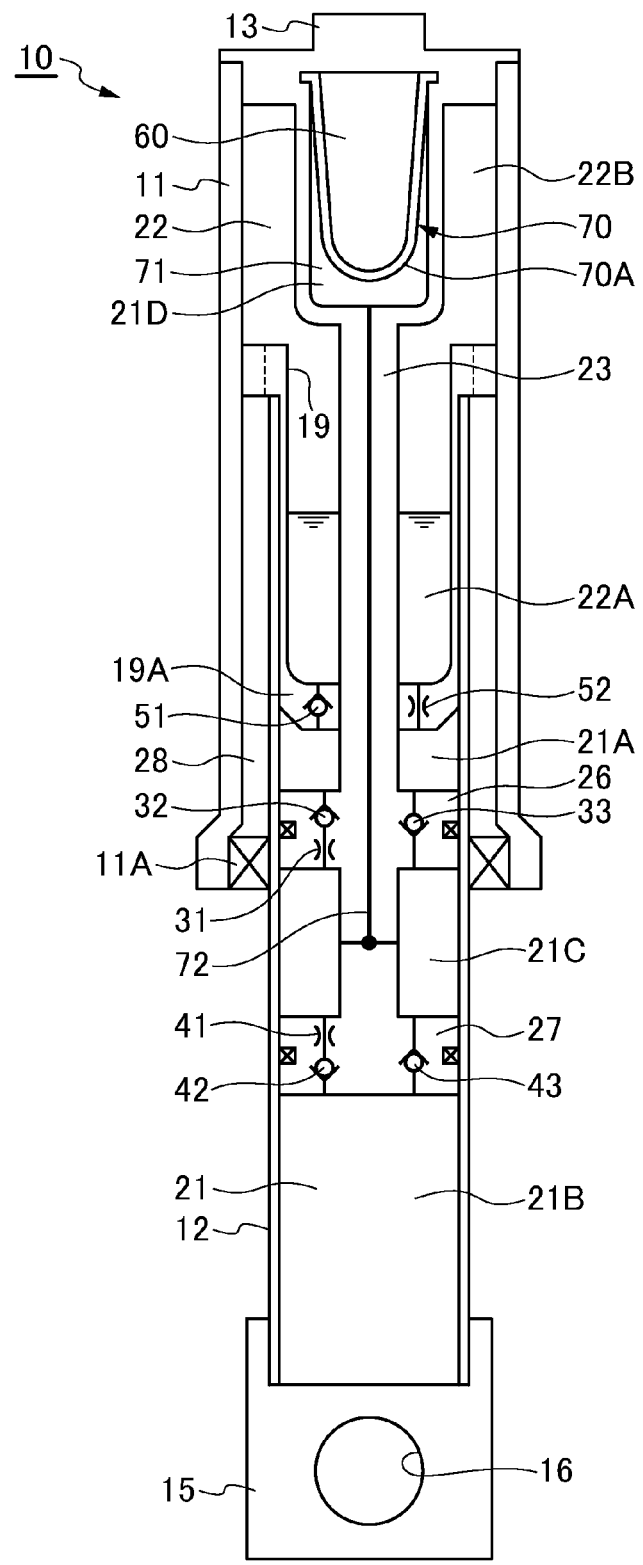
FIG. 5 is a schematic cross sectional view showing a hydraulic shock absorber in accordance with Embodiment 3.
Figure 6:
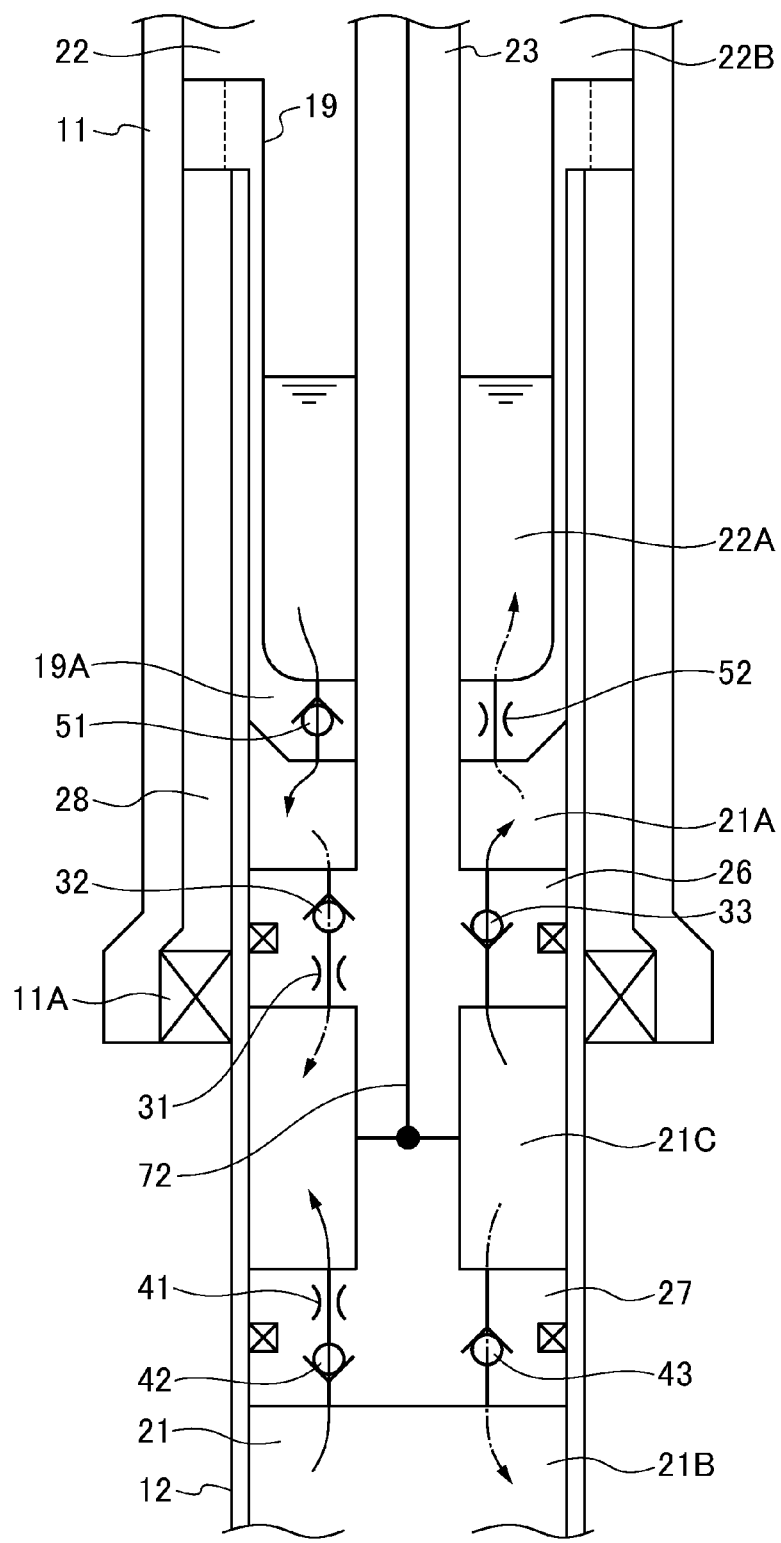
FIG. 6 is an enlarged cross sectional view of a substantial part in FIG. 5.

As shown in FIG. 5 and FIG. 6, an additional embodiment exists in a point that the intermediate air chamber 60 is defined by a flexible partition wall means 70 in place of the flexible partition wall means 61.

The flexible partition wall means 70 is arranged in an outer portion which is communicated with the intermediate oil chamber 21C. In other words, a sealed space 71 is formed in an upper portion of the piston rod 23, and a bladder 70A dividing an inner portion of the sealed space 71 into upper and lower sections is provided in the upper portion of the piston rod 23. In the inner portion of the sealed space 71, the lower space of the bladder 70A is formed as an outer oil chamber 21D which is communicated with the intermediate oil chamber 21C by a communication path 72 pierced in the piston rod 23. In the inner portion of the sealed space 71, the upper space of the bladder 70A is defined as the intermediate air chamber 60.

In accordance with the present embodiment, it is possible to form the intermediate air chamber 60 which is not limited to a volumetric capacity of the intermediate oil chamber 21C within the inner tube 12 and has a large volumetric capacity, in the outer portion which is communicated with the intermediate oil chamber 21C. In accordance with this, it is possible to easily set an air compression rate A1 of the upper portion air chamber 22B of the oil reservoir chamber 22 to be equal to or more than an air compression rate A2 of the intermediate air chamber 60.

Figure 7:
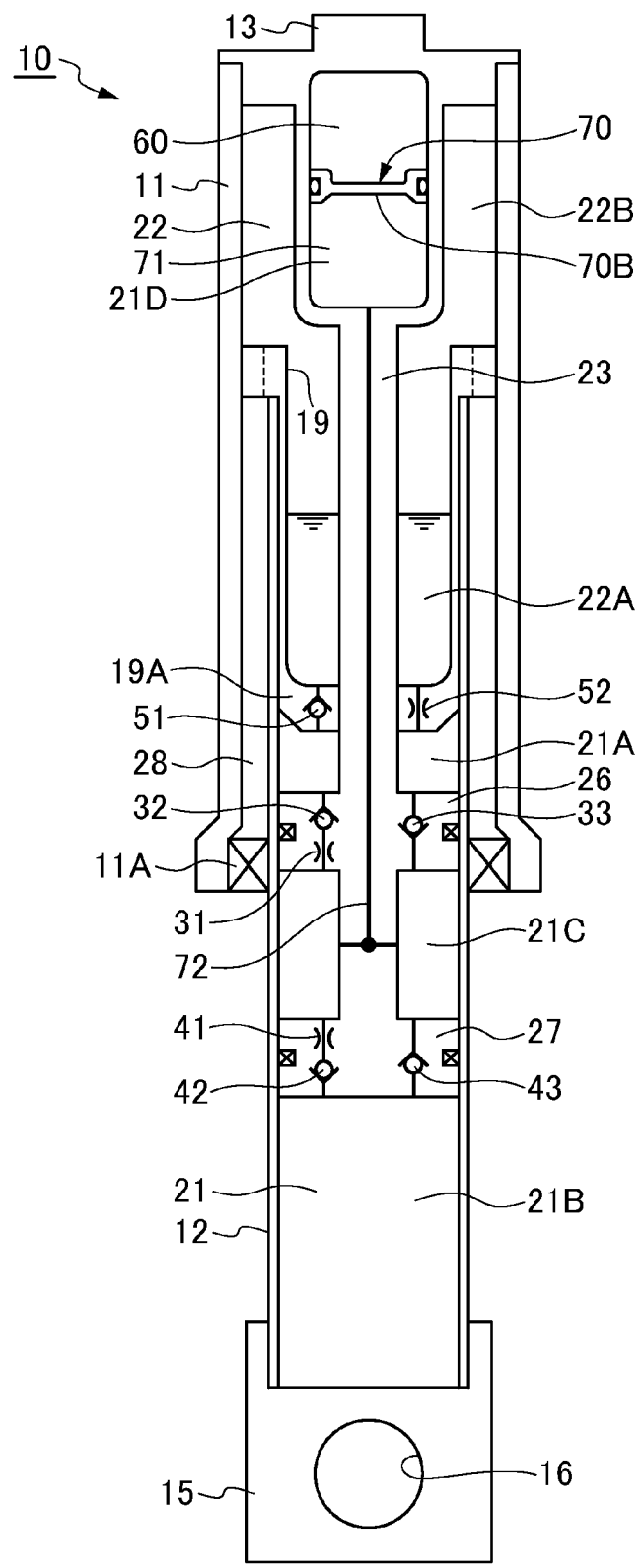
FIG. 7 is a schematic cross sectional view showing a hydraulic shock absorber in accordance with Embodiment 4.
Figure 8:
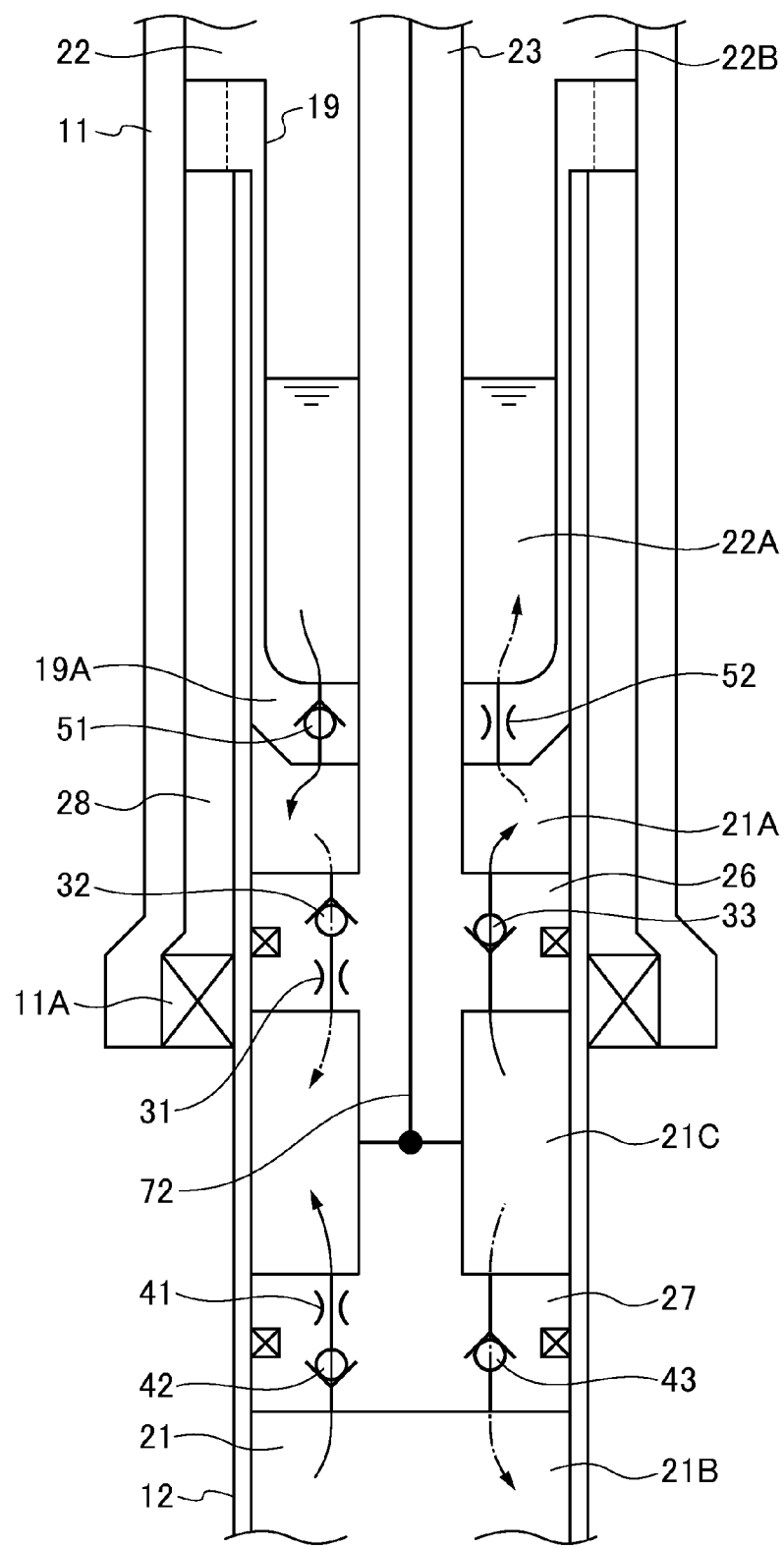
FIG. 8 is an enlarged cross sectional view of a substantial part in FIG. 7.

As shown in FIG. 7 and FIG. 8, an additional embodiment exists in a point that the flexible partition wall means 70 is constructed by a free piston 70B.

The flexible partition wall means 70 is structured such that an outer periphery of the free piston 70B is fitted in a liquid tight manner to the inner periphery of the sealed space 71, and the free piston 70B defines the upper space of the sealed space 71 as the intermediate air chamber 60.

Figure 9:
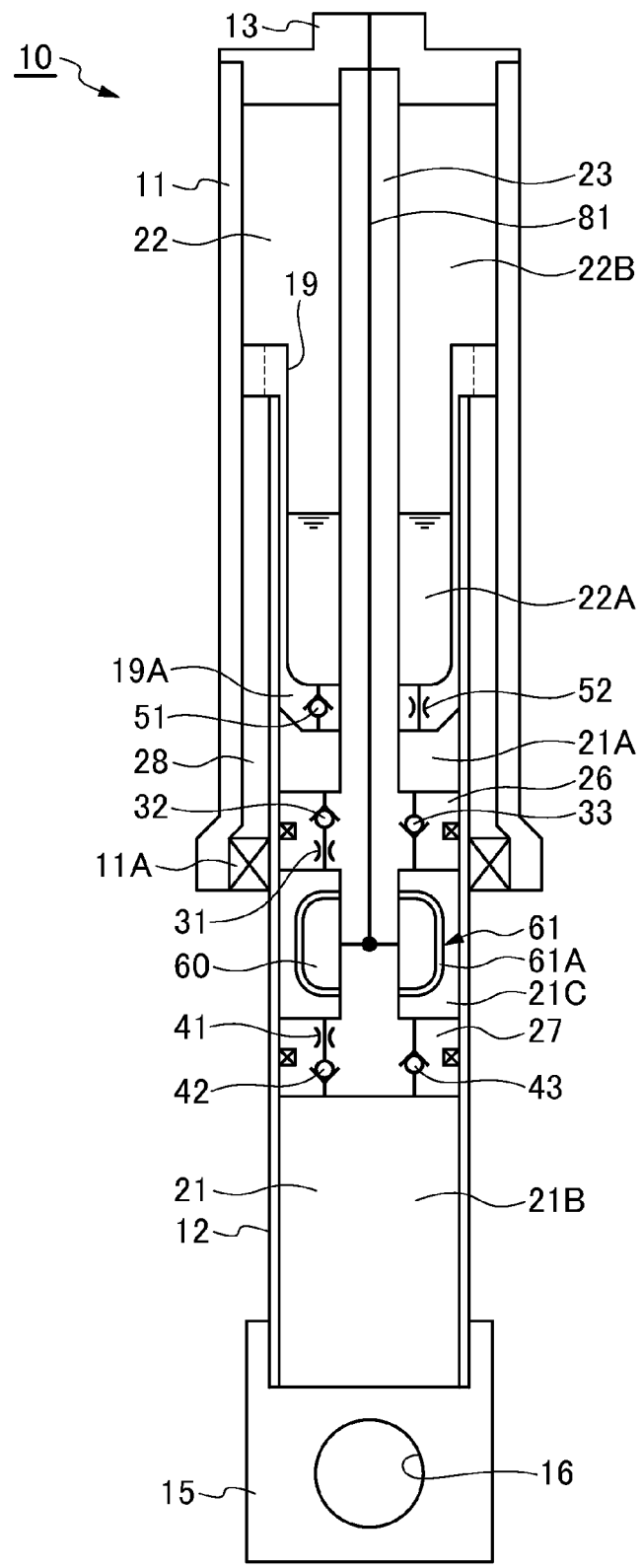
FIG. 9 is a schematic cross sectional view showing a hydraulic shock absorber in accordance with Embodiment 5.
Figure 10:
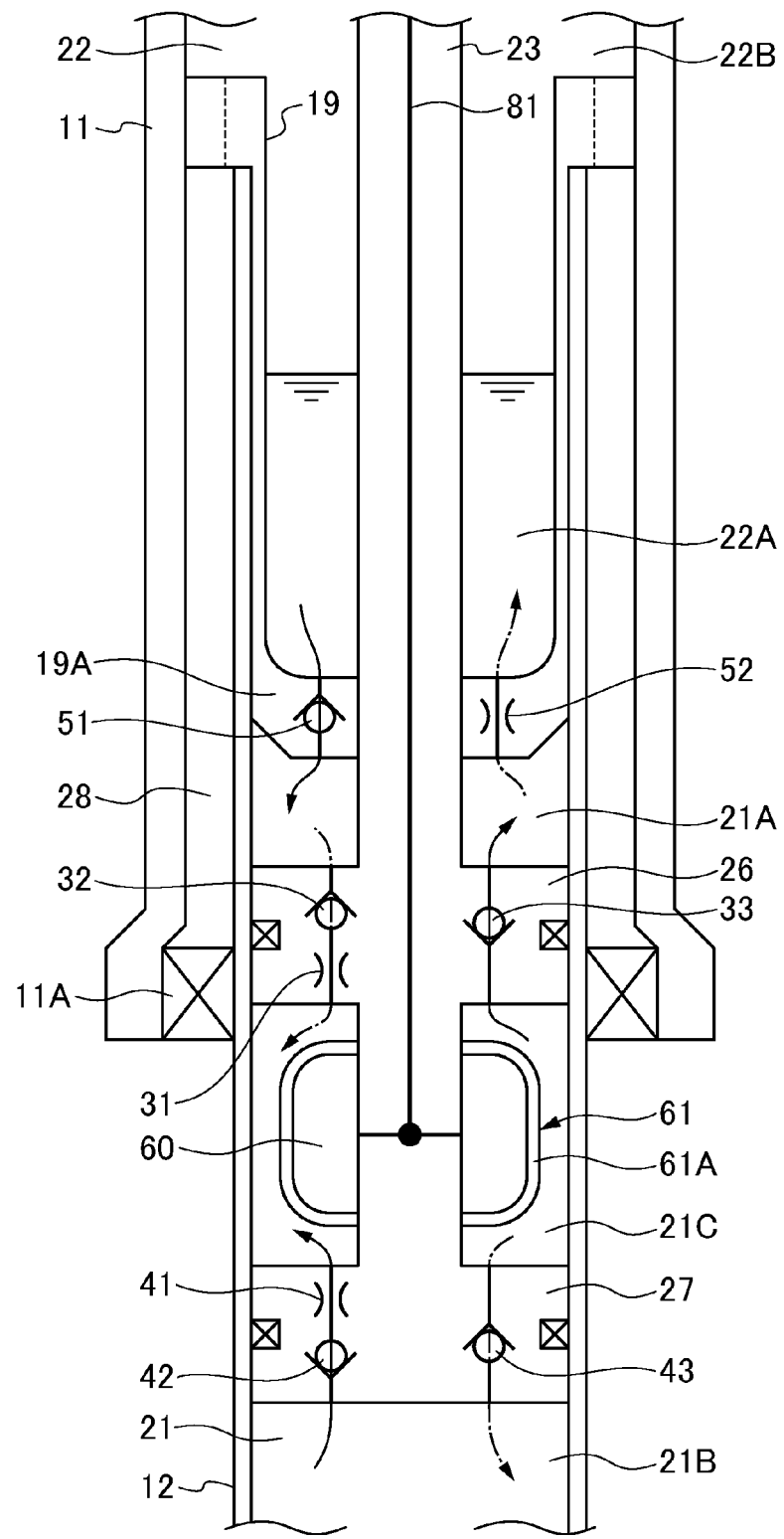
FIG. 10 is an enlarged cross sectional view of a substantial part in FIG. 9.

As shown in FIG. 9 and FIG. 10, an additional embodiment exists in a point that the intermediate air chamber 60 is left open to the ambient air.

The intermediate air chamber 60 defined by the bladder 61A of the flexible partition wall means 61 is left open to the ambient air via a communication path 81 which is pierced in the piston rod 23. In accordance with this, it is possible to easily set the air compression rate A1 of the upper portion air chamber 22B of the oil reservoir chamber 22 to be equal to or more than the air compression rate A2 of the intermediate air chamber 60.

Figure 11:
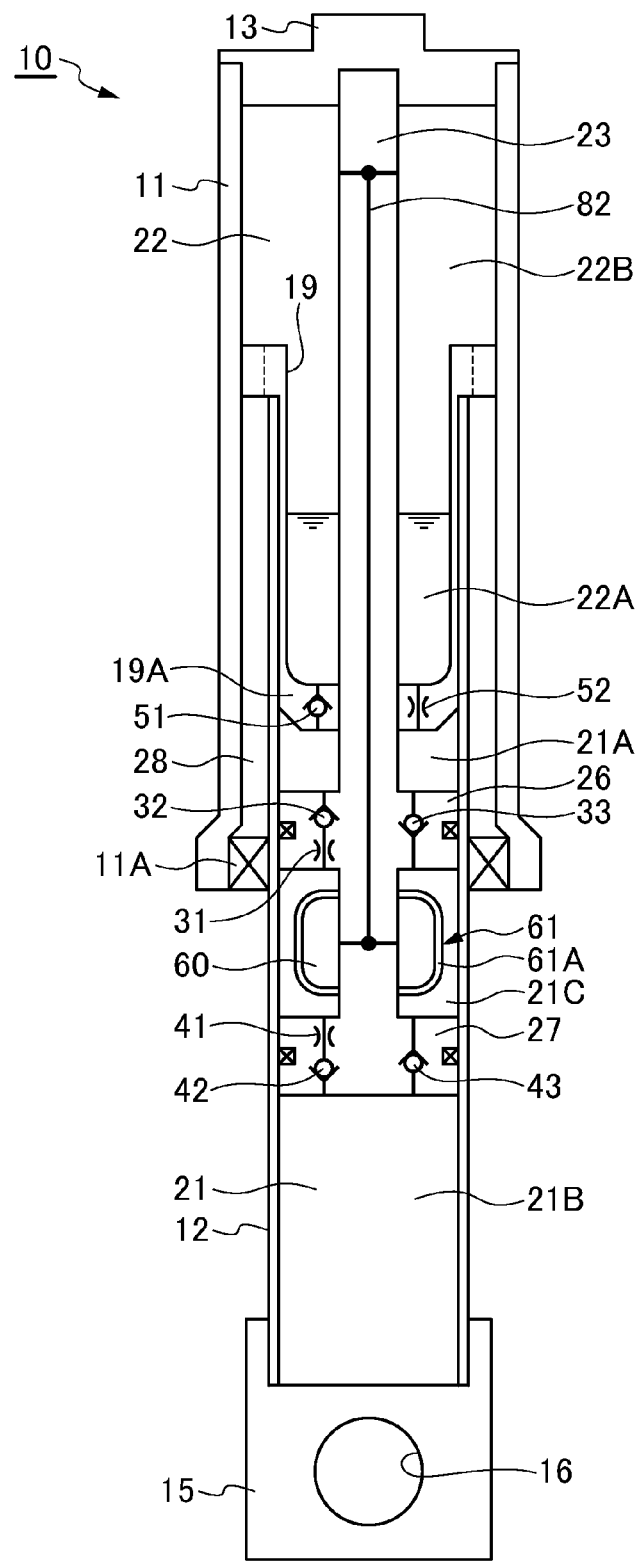
FIG. 11 is a schematic cross sectional view showing a hydraulic shock absorber in accordance with Embodiment 6.
Figure 12:
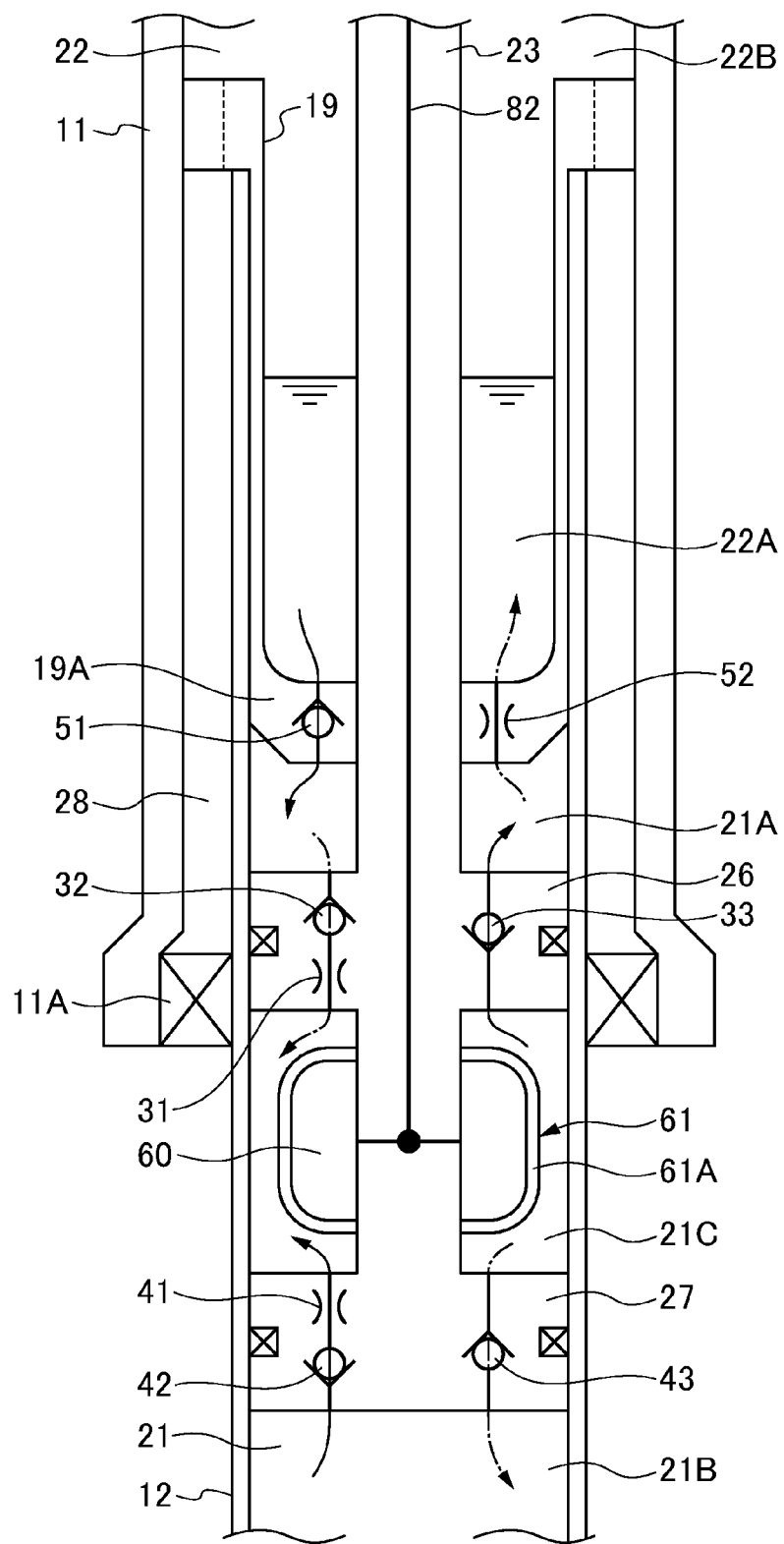
FIG. 12 is an enlarged cross sectional view of a substantial part in FIG. 11.

As shown in FIG. 11 and FIG. 12, an additional embodiment exists in a point that the intermediate air chamber 60 is communicated with the upper portion air chamber 22B of the oil reservoir chamber 22.

The intermediate air chamber 60 defined by the bladder 61A of the flexible partition wall means 61 is communicated with the upper portion air chamber 22B of the oil reservoir chamber 22 by a communication path 82 which is pierced in the piston rod 23. In accordance with this, it is possible to easily set the air compression rate A1 of the upper portion air chamber 22B of the oil reservoir chamber 22 to be equal to or more than the air compression rate A2 of the intermediate air chamber 60.

Figure 13:
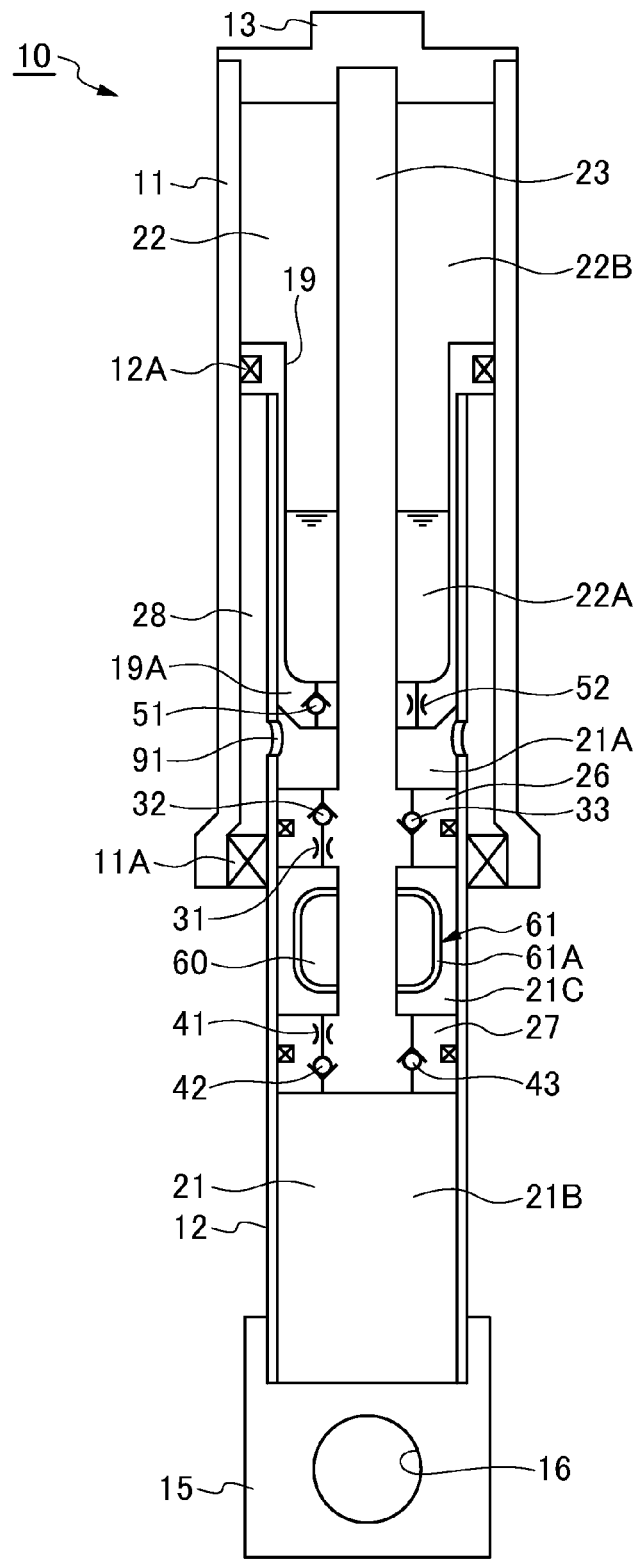
FIG. 13 is a schematic cross sectional view showing a hydraulic shock absorber in accordance with Embodiment 7.
Figure 14:
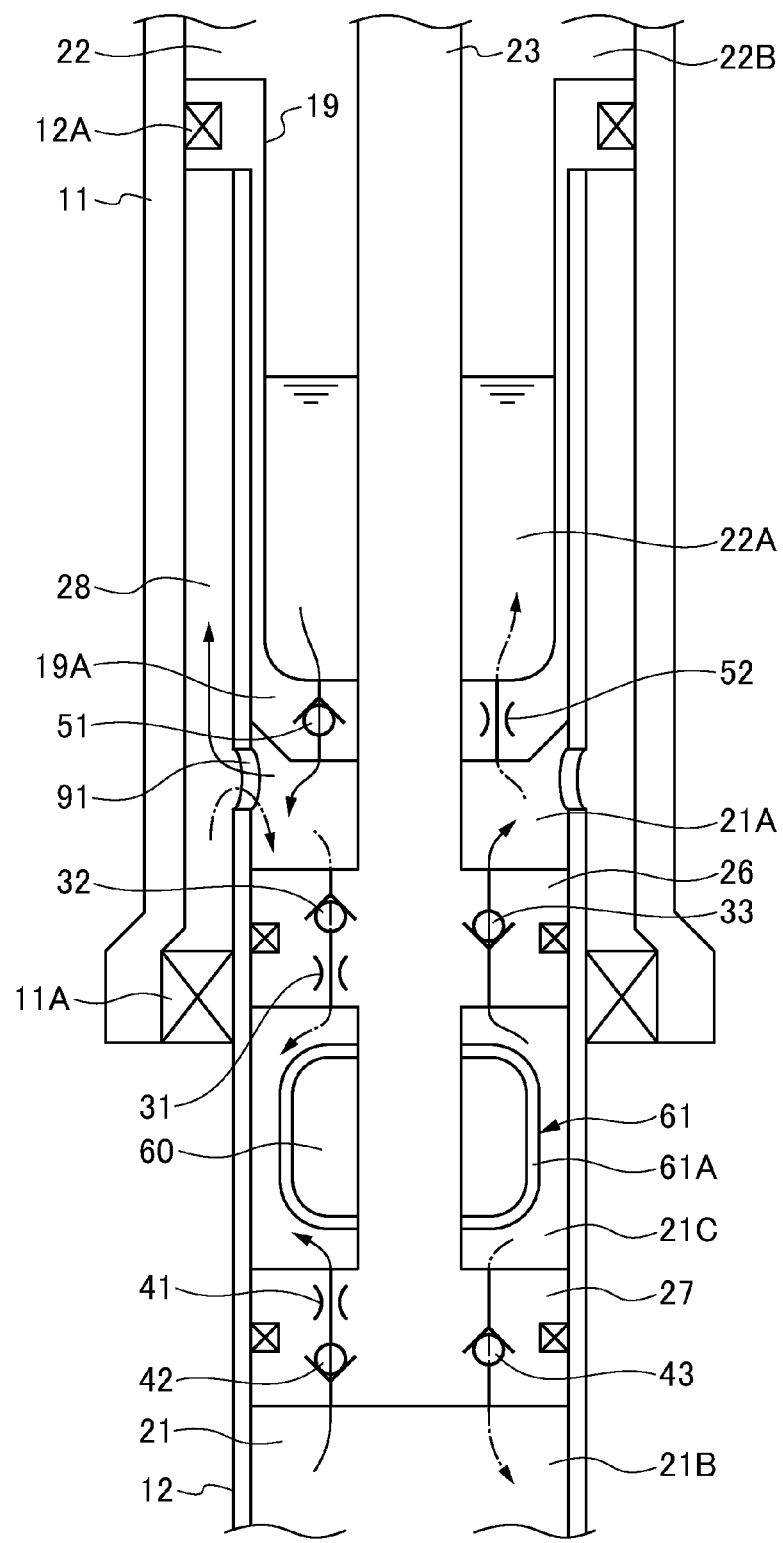
FIG. 14 is an enlarged cross sectional view of a substantial part in FIG. 13.
Figure 15:
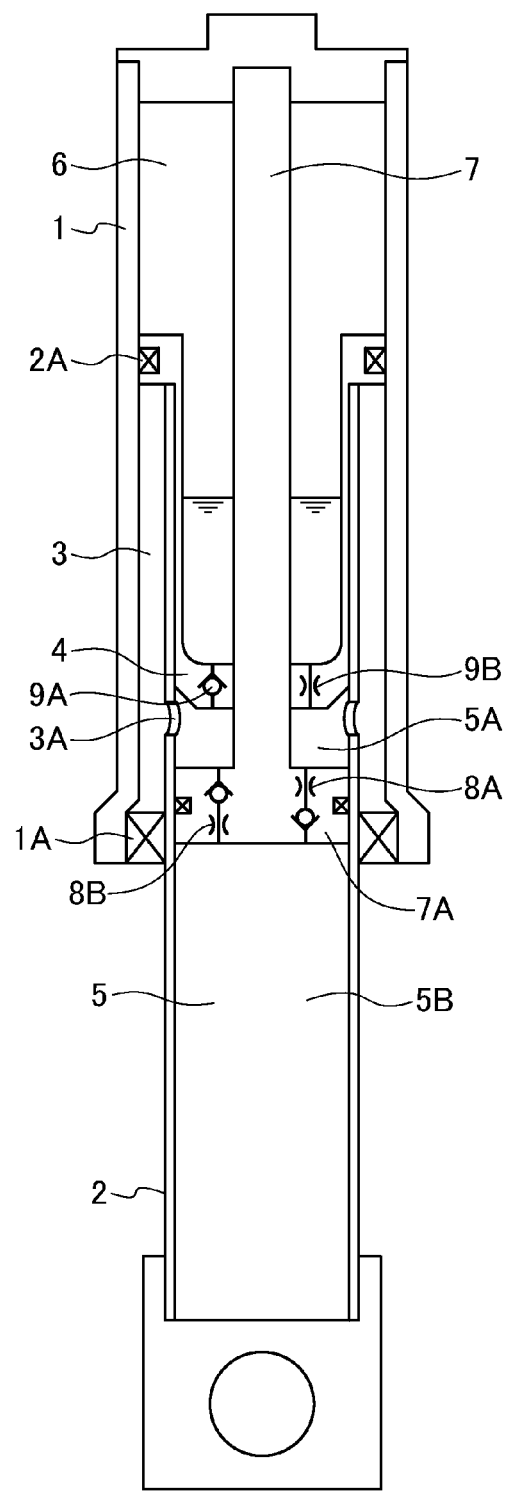
FIG. 15 is a schematic cross sectional view showing a prior art.

As shown in FIG. 13 and FIG. 14, an additional embodiment exists in a point that the annular oil chamber 28 between the inner periphery of the outer tube 11 and the outer periphery of the inner tube 12 is communicated with the upper oil chamber 21A by a communication hole 91 which is provided in the inner tube 12. The annular oil chamber 28 is defined by being surrounded by the inner periphery of the outer tube 11, the outer periphery of the inner tube 12, the seal means 11A which is fixed to the inner periphery of the lower end opening portion of the outer tube 11, and the seal means 12A which is fixed to the outer periphery of the upper end opening portion of the inner tube 12. In this manner, communication with the oil reservoir chamber 22 is shut off.

In accordance with the present embodiment, a compressing amount or an inflating amount of the intermediate air chamber 60 is reduced only at a volume change amount of the annular oil chamber 28 in the compression side stroke and the extension side stroke of the hydraulic shock absorber 10. In accordance with this, it is possible to reduce the air compression rate of the intermediate air chamber 60, and it is possible to achieve a downsizing of the flexible partition wall means 61.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

In accordance with the present invention, there is provided a hydraulic shock absorber comprising an outer tube. An inner tube is slidably inserted into the outer tube. A partition member is provided in an inner periphery of the inner tube. An oil chamber is defined at a lower side of the partition wall member. An oil reservoir chamber is defined at an upper side of the partition wall member. A piston rod is attached to the outer tube, the piston rod being slidably inserted into the inner tube through the partition wall member. A piston comes into slidable contact with the inner periphery of the inner tube, the piston being fixed to a leading end portion of the piston rod inserted into the inner tube. Upper and lower pistons forming upper and lower two stages are fixed to the leading end portion of the piston rod. An upper side of the upper piston is provided with an upper oil chamber in which the piston rod is accommodated. A lower side of the lower piston is provided with a lower oil chamber in which the piston rod is not accommodated. An intermediate oil chamber is provided between the upper and lower pistons. An extension side damping force generating means is provided in a flow path which is provided in the upper piston and heads for the intermediate oil chamber from the upper oil chamber. A compression side damping force generating means is provided in a flow path which is provided in the lower piston and heads for the intermediate oil chamber from the lower oil chamber. The partition wall member is provided with a volume compensating flow path which communicates the oil reservoir chamber with the oil chamber. An intermediate air chamber is provided in such a manner as to compensate an oil amount change in the oil chamber by coming into contact with the intermediate oil chamber and expanding and compressing on the basis of the oil amount change of the oil chamber caused by an extension and compression stroke of the piston rod. An air compression rate of the upper portion air chamber of the oil reservoir chamber is set to be equal to or more than an air compression rate of the intermediate air chamber, with respect to the extension and compression stroke of the piston rod. Accordingly, it is possible to achieve stabilization of a damping force generating mechanism, in a hydraulic shock absorber in which a piston is brought into slidable contact with an inner periphery of an inner tube.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A hydraulic shock absorber comprising:
   an outer tube;
   an inner tube slidably inserted into the outer tube;
   a partition wall member provided in an inner periphery of the inner tube;
   an oil chamber defined at a lower side of the partition wall member;
   an oil reservoir chamber defined at an upper side of the partition wall member;
   a piston rod attached to the outer tube, the piston rod being slidably inserted into the inner tube through the partition wall member; and
   a piston coming into slidable contact with the inner periphery of the inner tube, the piston being fixed to a leading end portion of the piston rod inserted into the inner tube,
   wherein the piston comprises upper and lower pistons, the upper and lower pistons form upper and lower two stages and are fixed to the leading end portion of the piston rod, an upper side of the upper piston is provided with an upper oil chamber in which the piston rod is accommodated, a lower side of the lower piston is provided with a lower oil chamber in which the piston rod is not accommodated, an intermediate oil chamber is provided between the upper and lower pistons,
   an extension side damping force generating means is provided in a flow path which is provided in the upper piston and heads for the intermediate oil chamber from the upper oil chamber, and a compression side damping force generating means is provided in a flow path which is provided in the lower piston and heads for the intermediate oil chamber from the lower oil chamber,
   the partition wall member is provided with a volume compensating flow path which communicates the oil reservoir chamber with the oil chamber,
   an intermediate air chamber is provided in such a manner as to compensate an oil amount change in the oil chamber by coming into contact with the intermediate oil chamber and expanding and compressing on the basis of the oil amount change of the oil chamber caused by an extension and compression stroke of the piston rod, and
   an air compression rate of an upper portion air chamber of the oil reservoir chamber is set to be equal to or more than an air compression rate of the intermediate air chamber, with respect to the extension and compression stroke of the piston rod.

2. The hydraulic shock absorber according to claim 1, wherein the intermediate air chamber is defined by a flexible partition wall means which is arranged in the intermediate oil chamber.

3. The hydraulic shock absorber according to claim 1, wherein the intermediate air chamber is defined by a flexible partition wall means which is arranged in an outer portion of the intermediate air chamber and which communicates with the intermediate oil chamber.

4. The hydraulic shock absorber according to claim 1, wherein the intermediate air chamber is left open to an ambient air.

5. The hydraulic shock absorber according to claim 2, wherein the intermediate air chamber is left open to an ambient air.

6. The hydraulic shock absorber according to claim 3, wherein the intermediate air chamber is left open to an ambient air.

7. The hydraulic shock absorber according to claim 1, wherein the intermediate air chamber is communicated with the upper portion air chamber of the oil reservoir chamber.

8. The hydraulic shock absorber according to claim 2, wherein the intermediate air chamber is communicated with the upper portion air chamber of the oil reservoir chamber.

9. The hydraulic shock absorber according to claim 3, wherein the intermediate air chamber is communicated with the upper portion air chamber of the oil reservoir chamber.

10. The hydraulic shock absorber according to claim 1, wherein the upper oil chamber is communicated with an annular oil chamber between the inner periphery of the outer tube and the outer periphery of the inner tube.

11. The hydraulic shock absorber according to claim 2, wherein the upper oil chamber is communicated with an annular oil chamber between the inner periphery of the outer tube and the outer periphery of the inner tube.

12. The hydraulic shock absorber according to claim 3, wherein the upper oil chamber is communicated with an annular oil chamber between the inner periphery of the outer tube and the outer periphery of the inner tube.

13. The hydraulic shock absorber according to claim 4, wherein the upper oil chamber is communicated with an annular oil chamber between the inner periphery of the outer tube and the outer periphery of the inner tube.

14. The hydraulic shock absorber according to claim 5, wherein the upper oil chamber is communicated with an annular oil chamber between the inner periphery of the outer tube and the outer periphery of the inner tube.

15. The hydraulic shock absorber according to claim 6, wherein the upper oil chamber is communicated with an annular oil chamber between the inner periphery of the outer tube and the outer periphery of the inner tube.

16. The hydraulic shock absorber according to claim 2, wherein the flexible partition wall means is constructed by a bladder which is provided around the piston rod.

17. The hydraulic shock absorber according to claim 2, wherein the flexible partition wall means is constructed by a free piston, an inner periphery of the free piston is slidably fitted in a liquid tight manner to an outer periphery of the piston rod, and an outer periphery of the free piston is slidably fitted in a liquid tight manner to an inner periphery of a closed-top tubular portion which is provided in the outer periphery of the piston rod and is open in its one end, respectively.

18. The hydraulic shock absorber according to claim 3, wherein the flexible partition wall means is structured such that a sealed space is formed in an upper portion of the piston rod, and the upper portion of the piston rod is provided with a bladder which divides an inner portion of the sealed space into upper and lower sections, and a lower space below the bladder in the inner portion of the sealed space is formed as an external portion oil chamber which is communicated with the intermediate oil chamber by a communication path pierced in the piston rod.

* * * * *